United States Patent [19]

Nishimatsu et al.

[11] Patent Number: 5,668,856
[45] Date of Patent: Sep. 16, 1997

[54] METHOD AND SYSTEM FOR SCREENING CALLS DIRECTED TO AN INTERNATIONAL TELEPHONE OPERATOR

[75] Inventors: Kaoru Nishimatsu; Hideki Amano; Shin-ichi Sakayori, all of Tokyo, Japan

[73] Assignee: Kokusai Denshin Denwa Kabushiki Kaisha, Japan

[21] Appl. No.: 662,489

[22] Filed: Jun. 13, 1996

Related U.S. Application Data

[63] Continuation of Ser. No. 438,410, May 10, 1995, abandoned.

[30] Foreign Application Priority Data

Aug. 5, 1995 [JP] Japan ................................. 6-202962

[51] Int. Cl.$^6$ ................................................. H04M 3/00
[52] U.S. Cl. .............................. 379/89; 379/67; 379/127; 379/249; 379/265
[58] Field of Search .................. 379/67, 88, 89, 379/188, 189, 249, 58, 59, 112, 127, 142, 145, 199, 223, 260, 261, 246, 245, 242, 265

[56] References Cited

U.S. PATENT DOCUMENTS

| | | | |
|---|---|---|---|
| 4,918,719 | 4/1990 | Daudelin | 379/67 |
| 5,127,043 | 6/1992 | Hunt et al. | 379/189 |
| 5,210,789 | 5/1993 | Jeffus et al. | 379/223 |
| 5,333,185 | 7/1994 | Burke et al. | 379/127 |
| 5,351,290 | 9/1994 | Naeini et al. | 379/189 |
| 5,357,564 | 10/1994 | Gupta et al. | 379/112 |
| 5,365,574 | 11/1994 | Hunt et al. | 379/189 |
| 5,365,580 | 11/1994 | Morisaki | 379/189 |
| 5,414,755 | 5/1995 | Bahler et al. | 379/189 |
| 5,420,910 | 5/1995 | Rudokas et al. | 379/59 |
| 5,440,615 | 8/1995 | Caccuro et al. | 379/67 |
| 5,463,681 | 10/1995 | Vaios et al. | 379/218 |
| 5,465,293 | 11/1995 | Chiller et al. | 379/188 |
| 5,473,671 | 12/1995 | Partridge, III | 379/127 |
| 5,495,521 | 2/1996 | Rangachar | 379/189 |
| 5,502,759 | 3/1996 | Cheng et al. | 379/189 |
| 5,504,810 | 4/1996 | McNair | 379/189 |
| 5,506,894 | 4/1996 | Billings et al. | 379/127 |

FOREIGN PATENT DOCUMENTS

| | | |
|---|---|---|
| 0 245 028 A2 | 11/1987 | European Pat. Off. . |
| 0 601 710 A2 | 6/1994 | European Pat. Off. . |
| 2 225 513 | 5/1990 | United Kingdom . |

*Primary Examiner*—Krista M. Zele
*Assistant Examiner*—Scott Wolinsky
*Attorney, Agent, or Firm*—Westman, Champlin & Kelly, P.A.

[57] ABSTRACT

A method and system for screening international phone calls to reduce the number of phone calls which are made simply for the purpose of talking with international operators (prank phone calls) and to reduce the workload of the operators. When an international incoming phone call is placed from a calling terminal abroad, a database is used to determine, based on the calling country code of the incoming phone call, whether the call is from a prank phone call country. If the call is from a prank phone call country, an announcement for determining the intention of the caller is sent to the caller. If the caller provides a response to the announcement, a determination is made as to whether the response is valid. If the response is determined to be valid, the call is connected to the operator. If the response is invalid, the call is determined to be a prank call and is thus disconnected.

8 Claims, 3 Drawing Sheets

METHOD AND SYSTEM FOR SCREENING CALLS DIRECTED TO AN INTERNATIONAL TELEPHONE OPERATOR

This is a continuation of application Ser. No. 08/438,410, filed May 10, 1995, now abandoned.

BACKGROUND OF THE INVENTION

1. Field of the Invention

This invention relates to international incoming prank phone call rejection method and system, particularly the international incoming prank phone call rejection method and system that reduce the workload of international telephone operators in handling ineffective calls by reducing the number of prank phone calls from overseas in international incoming phone call service where an international telephone operator in the United States is directly called from abroad.

2. Description of the Prior Art

International incoming phone call service where an international telephone operator in the United States is directly called from abroad has been offered. This service allows, for example, an American living or traveling in Japan or an English-speaking, foreign individual, who wishes to place a call to someone in the United States from Japan to directly call an international telephone operator in the United States by dialing a certain number without going through an operator in Japan. Therefore, the service allows the individual to call the desired party using only English. This service is extremely beneficial for individuals who speak little or no Japanese and is used by a large number of callers.

Under this international incoming phone call service, all international telephone calls originating abroad and terminating in the United States are connected to the aforementioned international telephone operator whether the call is a prank phone call or a valid call.

As under international incoming phone call service, a call is connected to an international telephone operator whether or not it is a prank phone call, the service has increased workload on operators and has increased the rate of occurrence where bona fide callers requesting for connection must wait to be connected to an operator.

SUMMARY OF THE INVENTION

The object of this invention is to provide international incoming prank phone call rejection method and system that can eliminate the problems with the prior art and reduce the number of prank phone calls from abroad connected to international telephone operators and therefore reduce the workload on the operators.

To accomplish the aforementioned object, the present invention is unique in that it employs an international incoming prank phone call rejection system for international incoming phone call service where an international telephone operator in the United States is directly called from abroad, and incorporates a means of determining whether a call is an international incoming phone call, a means of determining whether the call is from a prank phone call rejection country if it is an international incoming phone call, a means of automatic announcement for providing the caller with an announcement to determine whether the call is a prank phone call if it is from a prank phone call rejection country, and a means of disconnecting the call if the response from the caller to the announcement is invalid.

According to the invention, if a call is an international incoming phone call, it is determined whether the call is from a prank phone call rejection country. If the call is from a prank phone call rejection country, the aforementioned automatic announcement means transmits to the caller an announcement to determine whether the call is a prank phone call. If the response from the caller to this announcement is invalid, the invention judges the call to be a prank phone call and disconnects the call without connecting it to an international telephone operator.

As a result, prank phone calls are kept from being connected to international operators and thus the workload on the operators are reduced.

DETAILED DESCRIPTION OF THE PREFERRED EMBODIMENT

Figure 1:
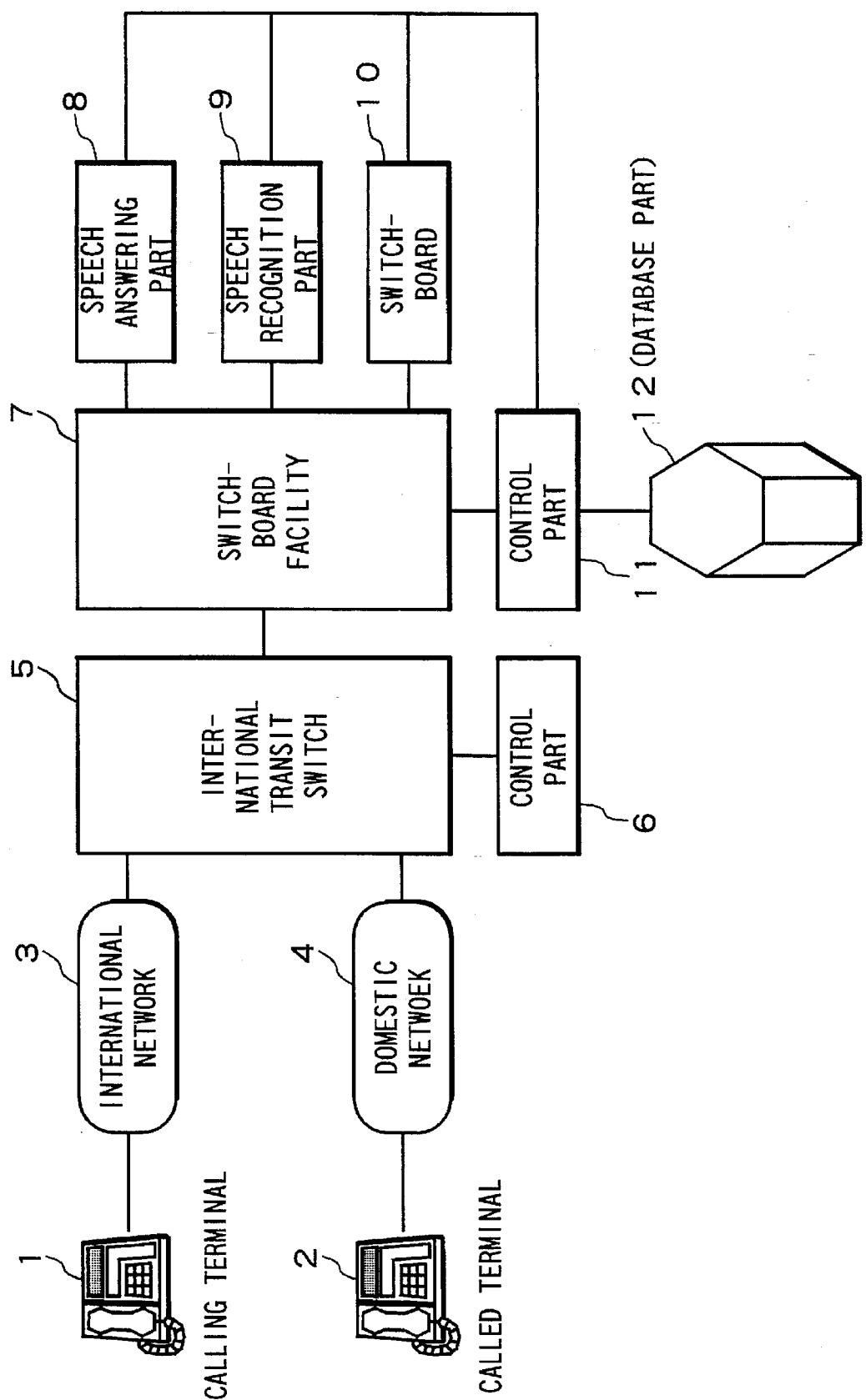
FIG. 1 shows a block diagram showing a system where an embodiment of this invention is applied and the general configuration of the hardware of this embodiment.

The invention is described in detail by referring to the drawing. FIG. 1 shows the general configuration of the international incoming prank phone call rejection system where an embodiment of the invention is applied and a block diagram of the general configuration of the hardware of this embodiment.

As shown in the figure, the system to which the embodiment is applied is composed of calling terminal 1 installed overseas, called terminal 2 installed in the United States, international network 3 that connects the calling terminal 1 and international transit switch 5, domestic network 4 that connects the called terminal 2 and international transit switch 5, international transit switch 5, and controller 6 that controls the operations of said international transit switch 5. The international incoming prank phone call rejection system in this embodiment is composed of switchboard facility 7 attached to said international transit switch 5, speech answering part 8, speech recognition part 9, switchboard 10, control part 11 of aforementioned switchboard facility 7, and database part 12 that stores data such as originating country codes.

Figure 2:
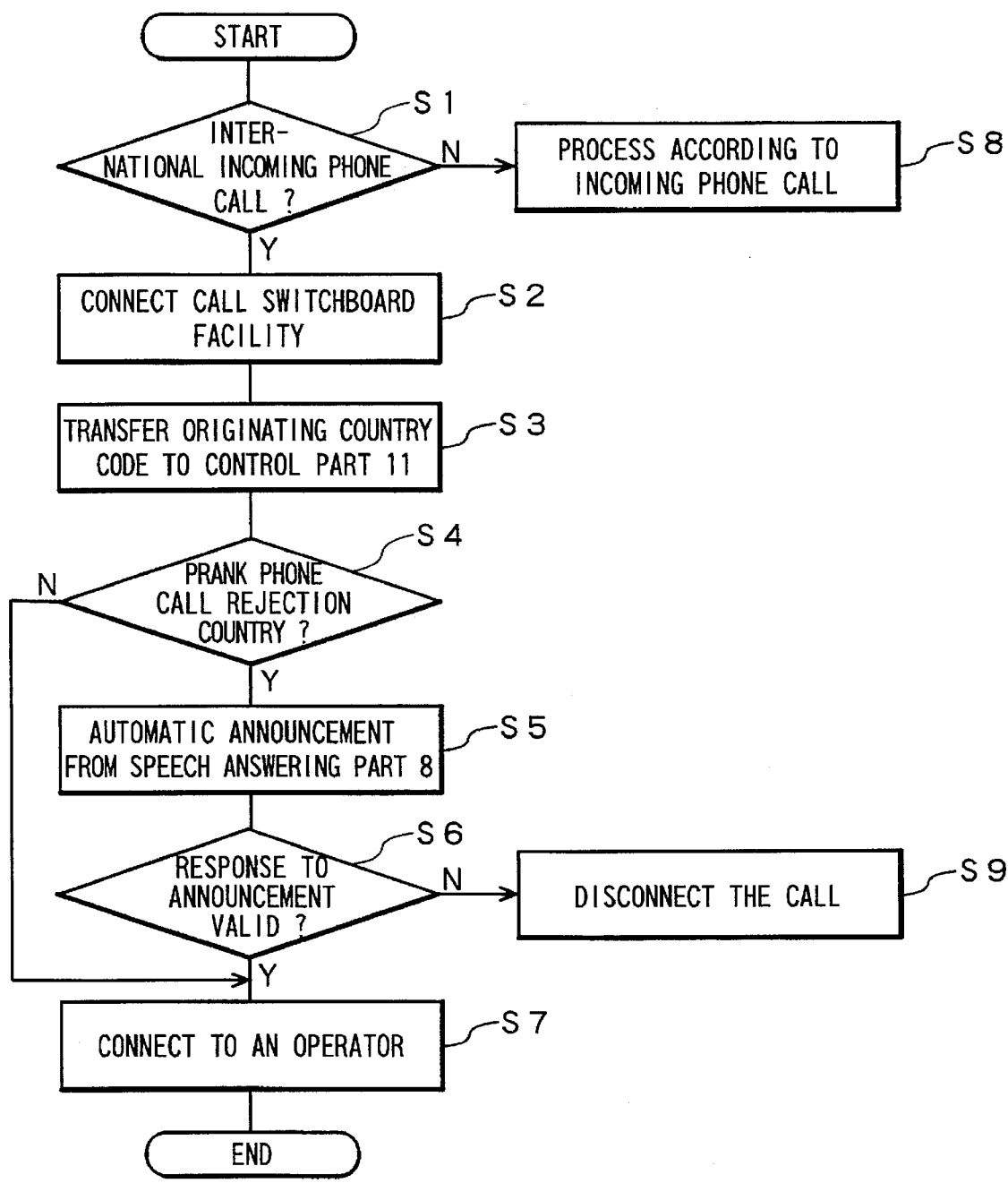
FIG. 2 shows a flowchart that describes the operations of this embodiment.
Figure 3:
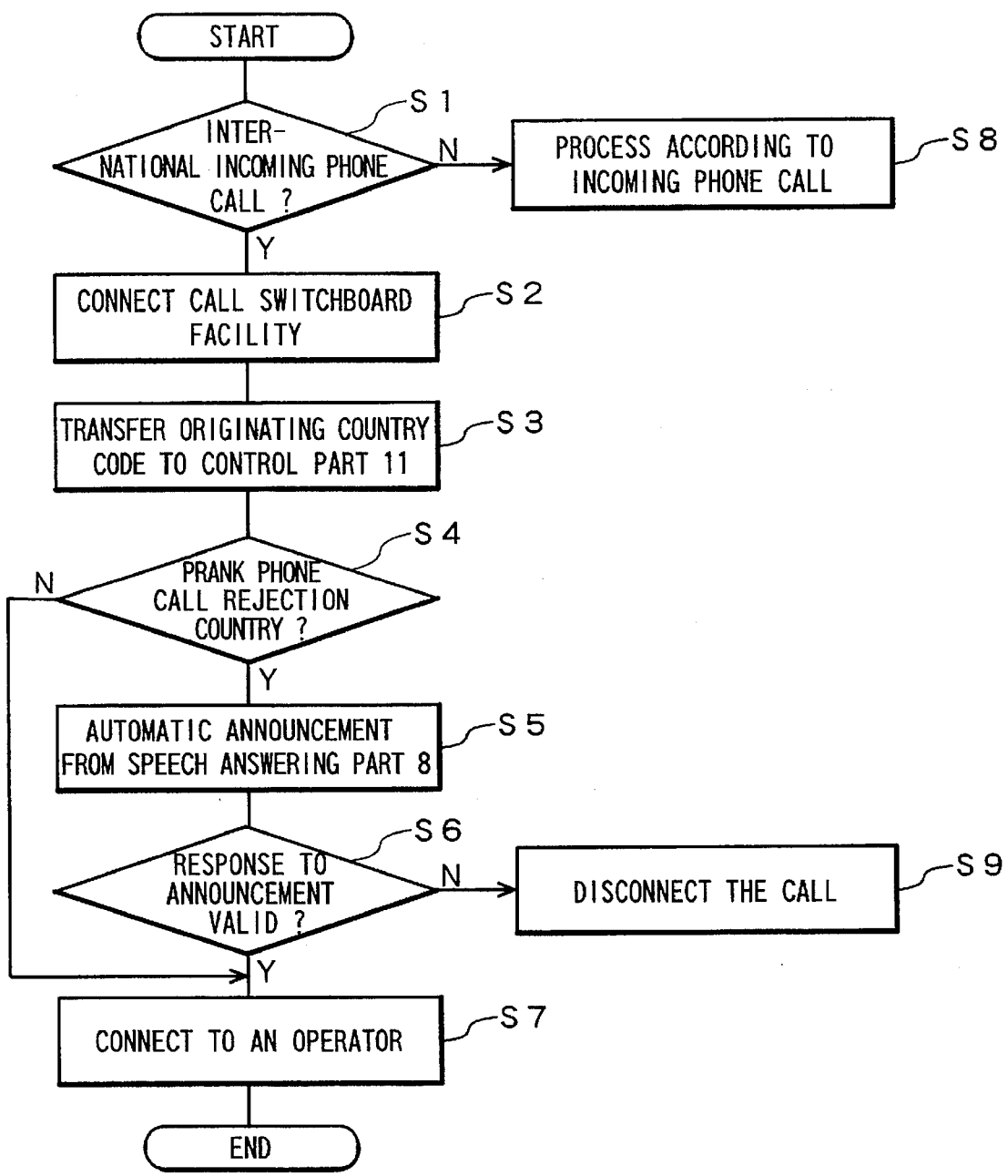

Next, FIGS. 1 and 2 are referred to explain the operations of this embodiment. Here, FIG. 2 is a flowchart that shows the general operations of this embodiment.

First, when a call arrives at international transit switch 5 from calling terminal 1 via international network 3, control part 6 determines, according to the called number, whether the call should be directly connected to a switch operator at an international telephone center (international operator) (Step S1). If control part 6 determines that the call should be directly connected to a switch operator at an international telephone center (Yes to Step S1), it connects said call from the international transit switch 5 to switchboard facility 7 (Step S2). On the other hand, if control part 6 determines that the call should not be directly connected to a switch operator at an international telephone center, it proceeds to Step S8 and performs a connection process suited to the incoming phone call.

If the call is connected from international transit switch 5 to switchboard facility 7, switchboard facility 7 transfers the calling country code of calling terminal 1 received from international transit switch 5 to control part 11 (Step S3). Control part 11 searches the data in database part 12 to determine whether calling terminal 1 is located in a prank phone call rejection country (Step S4), and if the call is from a prank phone call rejection country (Yes to Step S4), it transfers the call to speech answering part 8. If calling terminal 1 is not located in a prank phone call rejection country, it proceeds to step S7, and the call is connected to an operator. The data on prank phone call rejection countries is prepared based on past experience.

If the call is from a prank phone call rejection country, speech answering part 8 sends an automatic announcement to calling terminal 1 (Step S5), and inputs the returned voice response to speech recognition part 9. For example, the automatic announcement in English may say "You have reached XXXX. You will be charged for this call. Would you like to have this call connected to an operator? Please answer 'yes' or 'no.'" Speech recognition part 9 determines whether the voice response of the caller is valid (Step S6), and transfers the result to control part 11. If aforementioned voice response is valid, in essence if the response is "yes," "yes, please," etc., control part 11 transfers the call to switchboard 10 and connects it to a switch operator (Step S7). On the other hand, if the voice response is invalid, in essence if the response is "no" or a certain duration of time passes without the caller providing a response, the call is disconnected (Step S9). If no response is provided, as mentioned above, an announcement whose message is the same as the aforementioned automatic announcement, except in a language of the calling country or in a widely-recognized language such as English, may also be provided to solicit for the caller's agreement.

In this embodiment, if the call is a prank phone call, the caller is likely to respond "no," or provide an inappropriate response, or remain silent. Therefore, the judgement at Step 6 is likely to be negative in majority of cases. Consequently, the invention can reduce the number of prank phone calls from overseas that are connected to international operators.

As is clear from the explanation above, the present invention can reduce the number of prank phone calls from overseas in international incoming phone call service where callers directly call international telephone operators in the United States. Consequently, the invention can effectively reduce the workload on international telephone operators in handling ineffective calls. In addition, the invention is also effective in reducing the likelihood of callers making valid requests for connection having to wait to be connected to an operator.

The aforementioned embodiment is provided a case where the international incoming prank call rejection method and system are situated in an international telephone operation center in the United States. This invention, however, is not limited to applications in the United States, but international incoming prank call rejection method and system similar to the present invention may of course be situated in a country other than the United States.

What is claimed is:

1. An international incoming phone call screening method for an international incoming phone call service where an international telephone operator is called directly by a caller in a calling country, comprising the steps of:

determining from an international incoming phone call whether the international incoming phone call is from one of a plurality of predetermined calling countries;

sending a first automatic announcement to the caller inquiring whether the international incoming phone call is intended to be connected to the international telephone operator if said international incoming phone call is from one of said plurality of predetermined calling countries;

receiving from the caller a response to the first announcement; and connecting the international incoming phone call to the international telephone operator if the response to said first announcement from the caller indicates an intention to be connected to the international operator and disconnecting said international incoming phone call if said international incoming phone call is determined not to be intended for connection to the international operator.

2. The international incoming phone call screening method of claim 1 wherein the international incoming phone call is disconnected after a predetermined period of time if no response is received from the caller to said first announcement.

3. The international incoming phone call screening method of claim 1 wherein a second automatic announcement is sent to the caller for determining whether the international incoming phone call is intended for connection to the international operator.

4. The international incoming phone call screening method of claim 3 wherein the first and second automatic announcements are in a predetermined language.

5. The international incoming phone call screening method of claim 3 wherein the first and second automatic announcements are in a language of the calling country.

6. An international incoming phone call screening system for an international incoming phone call service where an international telephone operator is called directly by a caller in a calling country, comprising:

means for determining from an international incoming phone call whether said call is directed to an international telephone operator;

means for determining from said call whether said call is from one of a plurality of predetermined countries if it is determined that said call is directed to the international telephone operator;

automatic announcement means for sending an announcement to the caller inquiring whether said call is intended for connection to the international operator;

means for receiving a response to the announcement; and means for connecting said call to the international telephone operator if the response to said announcement indicates an intention that the call be connected to the international telephone operator.

7. The international incoming phone call screening system of claim 6 wherein said international incoming phone call is connected to an international telephone operator if said call is not from one of the plurality of predetermined countries.

8. The international phone call screening system of claim 6 wherein said predetermined countries are determined based on past experience.

* * * * *